United States Patent

Burns et al.

[11] Patent Number: 5,162,429
[45] Date of Patent: * Nov. 10, 1992

[54] SILICONE WATER BASED ELASTOMERS

[75] Inventors: Stephanie A. Burns; Donald T. Liles; Christine J. Schoenherr, all of Midland, Mich.

[73] Assignee: Dow Corning Corporation, Midland, Mich.

[*] Notice: The portion of the term of this patent subsequent to Sep. 18, 2007 has been disclaimed.

[21] Appl. No.: 682,162

[22] Filed: Apr. 5, 1991

Related U.S. Application Data

[60] Continuation-in-part of Ser. No. 526,478, May 21, 1990, abandoned, which is a division of Ser. No. 401,485, Aug. 30, 1989, Pat. No. 4,957,963.

[51] Int. Cl.$^5$ .................................................. C08K 3/36
[52] U.S. Cl. ............................ 524/790; 524/588; 524/789; 524/837; 524/863
[58] Field of Search ............... 524/588, 789, 790, 837, 524/863

[56] References Cited

U.S. PATENT DOCUMENTS

| | | | |
|---|---|---|---|
| 2,984,629 | 0/1961 | Loftman et al. | 252/313 |
| 4,221,688 | 9/1980 | Johnson et al. | 260/29.2 |
| 4,427,811 | 1/1984 | Ejias et al. | 524/96 |
| 4,584,341 | 4/1986 | Huebner et al. | 524/837 |
| 4,634,733 | 1/1987 | Bauman et al. | 524/859 |
| 4,661,556 | 4/1987 | Huebner et al. | 524/745 |
| 4,782,112 | 11/1988 | Kondo et al. | 524/837 |
| 4,889,770 | 12/1989 | Ona et al. | 524/837 |
| 4,954,565 | 9/1990 | Liles | 524/860 |
| 4,957,963 | 9/1990 | Burns et al. | 524/837 |
| 5,001,187 | 3/1991 | Liles et al. | 524/837 |
| 5,026,769 | 6/1991 | Liles | 524/837 |

Primary Examiner—John C. Bleutge
Assistant Examiner—Karen A. Hellender
Attorney, Agent, or Firm—Edward C. Elliott

[57] ABSTRACT

An improved aqueous silicone emulsion which cures to a reinforced elastomer upon removal of water is obtained through the use of an anionic, stable dispersion of fumed silica in water as the source of reinforcing silica. The fumed silica dispersion is combined with an aqueous, anionic emulsion of crosslinkable polydiorganosiloxane and a crosslinking system.

5 Claims, No Drawings

SILICONE WATER BASED ELASTOMERS

This is a continuation-in-part of copending application(s) Ser. No. 07/526,478 filed on May 21, 1990, now abandoned, which is a divisional of Ser. No. 07/401,485 now U.S. Pat. No. 4,957,963.

BACKGROUND OF THE INVENTION

1. Field of the Invention

This invention relates to silicone water based elastomers reinforced with fumed silica filler.

2. Background Information

Aqueous silicone emulsions which yield elastomers when the water is removed are known. A silicone emulsion having a dispersed phase of an anionically stabilized hydroxylated polydiorganosiloxane and a colloidal silica and a continuous phase of water in which the pH is 9 to 11.5, which provides an elastomeric product upon removal of the water at ambient conditions is taught in U.S. Pat. No. 4,221,688, issued Sep. 9, 1980. The colloidal silica is added in the form of a dry powder or as an aqueous dispersion, preferably as a sodium ion stabilized aqueous dispersion of colloidal silica.

U.S. Pat. No. 4,427,811, issued Jan. 24, 1984, discloses a silicone elastomeric emulsion having improved shelf life. The method of manufacture mixes an anionically stabilized, hydroxyl endblocked polydiorganosiloxane, colloidal silica, and an alkyl tin salt, ages the mixture for at least two weeks, then adds the filler other than colloidal silica.

U.S. Pat. No. 4,584,341, issued Apr. 22, 1986, teaches a method of producing a latex of crosslinked polydiorganosiloxane which yields an elastomer upon removal of the water. The latex can be reinforced by adding greater than 1 part by weight of colloidal silica sol or silsesquioxane.

U.S. Pat. No. 4,634,733, issued Jan. 6, 1987, discloses a method of producing a silicone elastomer from an emulsion. The latex can be used immediately upon mixing of the ingredients. The composition includes colloidal silica.

U.S. Pat. No. 4,661,556, issued Apr. 28, 1987 teaches a method of producing a colloidal silica reinforced polydiorganosiloxane emulsion. The method combines an acidic aqueous colloidal silica sol and low molecular weight hydroxyl endblocked polydiorganosiloxane with anionic emulsifying agent, then homogenizes the mixture to form an emulsion. The emulsion is then mixed with surface active anionic catalyst and polymerized, then neutralized. A curable emulsion can be produced by mixing the reinforced polydiorganosiloxane emulsion with diorganotindicarboxylate and alkylorthosilicate.

U.S. Pat. No. 4,954,565, issued Sep. 4, 1990, teaches the use of tin (II) (stannous) catalyst in aqueous silicone emulsions of anionically stabilized, hydroxyl endblocked polydiorganosiloxane, silane crosslinker, and colloidal silica reinforcement.

Aqueous dispersions of pyrogenic silica are described in U.S. Pat. No. 2,984,629, issued May 16, 1961. A pyrogenic silica is worked until the apparent bulk density is increased to between about 6 and 15 lbs/cu.ft., mixed with water, and subjected to high shear in the presence of a sulfonic acid.

SUMMARY OF THE INVENTION

An aqueous silicone emulsion which cures to an elastomer upon removal of the water can be reinforced by using anionic, stable dispersion of fumed silica dispersed in water as the source of silica to give a composition which yields higher physical strength than a similar composition made by reinforcing with colloidal silica.

DESCRIPTION OF THE INVENTION

This invention relates to an aqueous silicone emulsion which yields a reinforced elastomer upon removal of the water, said emulsion comprising an aqueous, anionic emulsion of crosslinked polydiorganosiloxane and a separately prepared anionic, stable dispersion of fumed silica in water.

The aqueous silicone emulsion which yields a reinforced elastomer upon removal of the water is the product obtained when a crosslinkable polydiorganosiloxane, such as a hydroxy terminated polydiorganosiloxane, a multifunctional alkoxysilane such as an alkyltrialkoxysilane, and an organic tin compound are present in the composition along with the separately prepared anionic, stable dispersion of fumed silica in water. The organic tin compound is preferably an organic stannous compound, such as stannous octoate. When such an emulsion is formed, the hydroxy terminated polydiorganosiloxane, alkyltrialkoxysilane, and organic tin compound are all present in the dispersed phase micelle and they react together to give crosslinking of the polymer. The degree of crosslinking necessary is that which gives an elastomer upon removal of the water from the dispersion.

Dispersions of anionic, stabilized fumed silica in water are commercially available at Ph varying from about 5 to 11. The amount of fumed silica in the emulsion varies from about 10 to 30 percent by weight. Generally, as the solids content of the emulsion is raised, the particle size of the silica is larger. Dispersions of fumed silica in water are offered by Cab-O-Sil Division of Cabot Corporation under the trademark "CAB-O-SPERSE". The dispersions are stated to be stabilized with ammonia and with potassium hydroxide. The CAB-O-SIL fumed silica used in CAB-O-SPERSE dispersions is a synthetic amorphous silica produced by the hydrolysis of silicon tetrachloride vapor in a flame of hydrogen and oxygen. This flame hydrolysis method of silica manufacture results in a product characterized by an unusual combination of physical and chemical properties. The physical properties include high external surface area, low density, and a three-dimensional chain-like structure of the primary particles. These properties of the fumed silica are retained in the dispersion of the silica in water which is used in this invention. The nominal particle sizes in various commercially available CAB-O-SPERSE grades vary from 7 to 30 nanometers. Preferably, an anionic, stabilized fumed silica dispersed in water having a pH above 7 is used when the dispersion is added to an emulsion of crosslinkable polydiorganosiloxane. When the fumed silica dispersion is used in the method where the silica is present during the polymerization of the polydiorganosiloxane oligomer, it is preferred that the pH of the silica dispersion be below 7.

The above described anionic, stabilized fumed silica dispersions are different from the aqueous sodium ion stabilized colloidal silica such as is described in U.S. Pat. No. 4,221,688, issued Sep. 9, 1980. The colloidal silicas described there include solid fume colloidal silicas and precipitated colloidal silicas, the preferred colloidal silicas being those which are available in an aqueous medium. Those inventors state that colloidal silicas in an aqueous medium are usually available in a stabilized form, such as those stabilized with sodium ion, ammonia, or an aluminum ion; and that aqueous colloidal silicas which have been stabilized with sodium ion are particularly useful for their invention. They are referring to aqueous silica sols, generally prepared by removing all but a small portion of the alkali metal present in water glass to produce a colloidal system of what might be described as polymeric silicic acid. One process for taking such a product and concentrating it to a useful concentration is described in U.S. Patent Reissue No. Re 25,252, reissued Oct. 9, 1962, to Nalco Chemical Company. Commercial products are available such as Nalcoag 1115, a 15 percent solids colloidal silica dispersion having silica particles of a surface area of about 750 m$^2$/g, Nalcoag 1030, a 30 percent solids colloidal silica dispersion having silica particles of a surface area of about 375 m$^2$/g, and Nalcoag 1050, a 50 percent solids colloidal silica dispersion having silica particles of a surface area of about 150 m$^2$/g, all from Nalco Chemical Company.

Various methods may be used to combine the ingredients necessary to give a crosslinkable polydiorganosiloxane emulsion and the anionic, stable dispersion of fumed silica in water to yield the composition of this invention, which is an aqueous silicone emulsion which yields a reinforced elastomer upon removal of the water. The emulsion, before removal of the water, comprises an aqueous, anionic emulsion of crosslinked polydiorganosiloxane and the fumed silica from the anionic, stable dispersion of fumed silica which is used in the preparation of the final emulsion.

A method of making the emulsion crosslinked polydiorganosiloxane which yields a reinforced elastomer upon removal of the water is one made in accordance with U.S. Pat. No. 4,221,688, is issued Sep. 9, 1980, which patent is hereby incorporated by reference to show a suitable emulsion and the method of its manufacture. This invention prepares a silicone emulsion by emulsifying a hydroxylated polydiorganosiloxane which contains about 2 silicon-bonded hydroxyls per molecule using anionic surfactant and water, adding a colloidal silica and an organic tin compound, and adjusting the pH of the resulting emulsion within the range from 9 to 11.5 inclusive. When this method is modified so that an anionic, stable dispersion of fumed silica is used in place of the colloidal silica taught in the method of '688, the method becomes a method of producing the emulsion of the instant invention. The elastomer produced by removal of the water has a higher tensile strength when the anionic, stable dispersion of fumed silica is used to supply the silica than when the colloidal silica called for in the '688 patent is used. The crosslinking process in this method is very slow and the emulsion needs to age for a considerable period of time, such as 2 months or longer, before sufficient crosslinking is present in order to give an elastomer having reasonable mechanical properties upon removal of the water.

An aqueous, anionic emulsion of polydiorganosiloxane can be produced by the method of U.S. Pat. No. 3,294,725, issued Dec. 27, 1966, which teaches homogenizing an organosiloxane and polymerizing using a surface active sulfonic acid catalyst. This procedure yields an aqueous, anionic emulsion of crosslinkable polydiorganosiloxane. When desired the molecular weight of the polymer can be greater than 50,000. When such an emulsion is combined with a crosslinking agent of the formula

where n is 0 or 1, R and R' are hydrogen or monovalent hydrocarbon radicals having from 1 to 6 carbon atoms, and an organic tin compound, the resulting product gives an elastomer upon removal of the water. When an anionic, stable dispersion of fumed silica in water is also included, the aqueous silicone emulsion of this invention results.

Examples of organic tin compound which are useful as a catalyst include dialkyltindicarboxylates, such as dibutyltindiacetate, dibutyltindilaurate, and dioctyltindilaurate; and stannous carboxylates, such as stannous oleate, stannous 2-ethylhexanoate, and stannous naphthanate.

When the aqueous silicone emulsion is the product obtained by mixing an aqueous, anionic emulsion of crosslinkable polydiorganosiloxane, alkoxysilane crosslinker, organic tin compound, and the anionic, stable dispersion of fumed silica, the crosslinking reaction is relatively rapid. Crosslinking to give an elastomeric product upon removal of the water from the emulsion can take place in as little as from 30 minutes to 2 days. The amount of crosslinking can be measured experimentally be casting a film of the emulsion, removing the water, and evaluating the resultant film. The rate of crosslinking depends upon the amount and kind of both crosslinker and organic tin compound selected.

An aqueous silicone emulsion which cures to a reinforced elastomer upon removal of the water results when 100 parts by weight of the above described aqueous, anionic emulsion of crosslinkable polydiorganosiloxane having hydroxyl endblocking and a molecular weight of greater than 50,000 is mixed with from 1 to 40 parts by weight of fumed silica anionically dispersed in water, and with from 0.2 to 2.0 parts by weight of a crosslinking agent of the formula

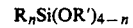

where n is 0 or 1, R and R' are hydrogen or monovalent hydrocarbon radicals having from 1 to 6 carbon atoms, and from 0.1 to 2.0 parts by weight of an organic tin compound.

The anionic emulsion of crosslinkable polydiorganosiloxane can be mixed with the anionic, stabilized fumed silica dispersion, the crosslinking agent, and the organic tin compound and allowed to react. The product will yield an elastomer upon removal of the water.

Another useful method mixes the anionic emulsion of crosslinkable polydiorganosiloxane, anionic stabilized fumed silica dispersion, and organic tin compound, then ages, followed by addition of the crosslinking agent. Yet another method mixes the anionic emulsion of crosslinkable polydiorganosiloxane, crosslinking agent, and organic tin compound, ages, then adds the anionic, stabilized fumed silica dispersion.

The composition can also be produced by a method which polymerizes a polydiorganosiloxane in the presence of the filler by a method comprising (A) homogenizing (1) 100 parts by weight of hydroxyl endblocked polydiorganosiloxane oligomer, (2) 1 to 40 parts of fumed silica anionically dispersed in water, (3) optionally additional water, and (4) surfactant, then (B) adding sufficient acid to adjust the pH to less than 3, then (C) allowing the oligomer to polymerize to the desired degree, then (D) terminating polymerization by raising the pH to greater than 9, and (E) adding (5) 0.1 to 2.0 parts by weight of organic tin compound, then (F) admixing (6) from 0.2 to 2.0 parts by weight of crosslinking agent of the formula $$R_nSi(OR')_{4-n}$$

where n is 0 or 1, R and R' are hydrogen or monovalent hydrocarbon radicals having from 1 to 6 carbon atoms, to yield an aqueous silicone emulsion which cures to a reinforced elastomer upon removal of the water.

The organic radicals of the polydiorganosiloxane oligomer can be monovalent hydrocarbon radicals containing less than seven carbon atoms per radical and 2-(perfluoroalkyl)ethyl radicals containing less than seven carbon atoms per radical. The oligomer preferably contains organic radicals in which at least 50 percent are methyl. The surfactant is chosen so that it forms a stable emulsion and also allows the oligomer to be polymerized. A preferred surfactant is an alkyl sulfate, the preferred alkyl sulfate is sodium lauryl sulfate.

When sodium lauryl sulfate is used as the surfactant (4), the acid of step (B) is preferably a dilute mineral acid, such as hydrochloric acid. The dilute hydrochloric acid reacts with the sodium lauryl sulfate to give hydrogen lauryl sulfate, which is an active polymerization catalyst for the polydiorganosiloxane oligomer.

The surfactant of (4) can also be a surface active sulfonic acid such are described in U.S. Pat. No. 3,294,725, issued Dec. 27, 1966, to Findley and Weyenberg, which patent is hereby incorporated by reference to show suitable surfactants and polymerization catalysts for the emulsion polymerization of polydiorganosiloxane oligomer. When a surface active sulfonic acid such as a preferred dodecylbenzene sulfonic acid is used as surfactant (4), the pH of the mixture will be less than 3, so it is no longer necessary to add another acid as is called for in step (B) of this method.

In either case, the oligomer is then allowed to polymerize to the desired degree. This polymerization will take place over time at room temperature, one or two days is generally sufficient to yield a high molecular weight polymer. The polymerization rate can be raised by raising the temperature.

After the polymerization has proceeded to the desired degree, the polymerization is terminated by raising the pH of the emulsion to greater than 9. The preferred method is the addition of dilute aqueous sodium hydroxide or an organic amine compound such as diethylamine or 2-amino-2-methyl-1-propanol. The preferred method uses a 20 percent aqueous diethylamine dispersion.

The emulsion is then catalyzed and made curable by the addition of catalyst and crosslinker. The catalyst is an organic tin compound in which the alkyl radical is a radical such as butyl or octyl, and the carboxylate is a radical such as acetate, laurate, or octoate. The preferred catalyst is dioctyltindilaurate or stannous octoate (stannous 2-ethylhexanoate). The amount of catalyst is not critical and can vary from 0.1 to 2.0 parts by weight per 100 parts by weight of oligomer. The preferred amount is about 0.5 parts, which gives a crosslinked polymer in the emulsion in about 1 day. The time required for the polymer to become crosslinked varies with the amount of catalyst used and the crosslinker chosen.

The crosslinker is of the formula $R_nSi(OR')_{4-n}$ where n is 0 or 1, R and R' are hydrogen or monovalent hydrocarbon radicals having from 1 to 6 carbon atoms. Useful crosslinking agents include vinyltrimethoxysilane, methyltrimethoxysilane, ethylorthosilicate, and methylorthosilicate, with the preferred crosslinking agent being vinyltrimethoxysilane.

The above method allows the production of an emulsion having a higher solids content in that the water present in ingredient (2) can be part or all of the water used to make the emulsion.

The methods described above produce an improved emulsion which cures to an elastomer upon removal of the water, the elastomer having improved physical properties because of the anionic, stable dispersion of fumed silica that was used to produce the emulsion. The emulsion is useful as a coating material. It can be further modified with additional dispersed fumed silica, extending fillers, pigments, and such to yield other types of coatings and sealants.

The following examples are included for illustrative purposes only and should not be construed as limiting the invention which is properly set forth in the appended claims. All parts are parts by weight.

EXAMPLE 1

Fifty grams of an emulsion of an anionic, emulsion polymerized polydimethylsiloxane having a molecular weight of about 200,000, the emulsion having a solids content of about 60 percent by weight and a pH of about 10 was placed in a flask and mixed with 27.4 g of CAB-O-SPERSE (R) SC-2 dispersed silica (pH of about 8.8, a silica surface area of 160 m$^2$/g, and 18 percent solids) to give 15 parts of silica per 100 parts of polymer. To the stirring mixture was added 0.62 g of 50 percent solids by weight emulsion of dioctyltindilaurate and 0.16 g of vinyltrimethoxysilane. The mixture was then allowed to react at room temperature for 48 hours. A sample of this material was poured into a petri dish and allowed to dry. After 8 more days another sample was poured into a petri dish and allowed to dry. At 4 weeks after mixing, the dried samples were measured for physical properties with these results:

| Emulsion age after mixing | Tensile Strength MPa | Elongation percent |
| --- | --- | --- |
| 2 days | 2.34 | 855 |
| 10 days | 3.18 | 900 |

EXAMPLE 2

A sample was prepared as in Example 1 by mixing the polydimethylsiloxane emulsion, the silica emulsion, and the dioctyltindilaurate emulsion. This mixture was allowed to age at room temperature for 48 hours. Then 0.16 g of vinyltrimethoxysilane was added. Periodically samples were poured into petri dishes and allowed to dry for the times as shown below. One month after mixing, the dried samples were tested for physical properties with the following results:

| Emulsion age after addition of vinyltrimethylsilane | Tensile Strength Mpa | Elongation percent |
| --- | --- | --- |
| 10 minutes | 2.16 | 708 |
| 2 days | 2.54 | 768 |
| 10 days | 2.60 | 775 |

A similar emulsion reinforced by dispersing colloidal silica in the emulsion in the same amount typically has about 1.7 MPa tensile strength and about 400 percent elongation.

EXAMPLE 3

A 600 g portion of the polydimethylsiloxane emulsion of Example 1 was crosslinked by mixing it with 1.86 g of vinyltrimethoxysilane and 1.49 g of the catalyst emulsion of Example 1, then adjusting to a pH of about 9.8 by adding diethylamine. The emulsion was then stored in a closed container for 20 days. After the storage period, 20 g samples were placed in vials, then a sample of aqueous, dispersed fume silica was added to each vial as shown in the following table. The silica dispersions were added so that each emulsion contained 15 parts or 20 parts of silica per 100 parts of polymer. Each vial was shaken for 10 minutes to mix, then centrifuged to exclude air bubbles. Each sample was then poured into a petri dish and allowed to air dry at ambient conditions. After air drying for 6 days, the films were measured for physical properties with the results shown in the following Table I.

0.279 g of the catalyst of Example 1. This gave a total silica content of 15 parts per 100 parts of polymer. After 3 days at room temperature, 0.135 g of vinyltrimethoxysilane was added and samples were poured into petri dishes and allowed to dry. The dried film had a tensile strength of 3.48 MPa and an elongation of 890 percent.

EXAMPLE 5

An emulsion was prepared using the anionic, stable dispersion of fumed silica in water used in this invention and a comparative emulsion was prepared using colloidal silica to illustrate the difference in the products produced by the two different compositions.

First, an Emulsion A was prepared by weighing into a jar 250 g of an anionically stabilized hydroxy terminated polydimethylsiloxane emulsion having a solids content of about 70 percent by weight and a pH of about 10, the emulsion particles being less than 0.6 micrometers in average diameter and the polymer having a molecular weight average of greater than 240,000. Then the pH of the emulsion was raised to approximately 11 by addition (with stirring) of 2-amino-2-methyl-1-propanol (AMP-95). Next, 1.75 g of 50 percent solids by weight emulsion of dioctyltindilaurate was added and the emulsion was stirred for several minutes. Next, 145.8 g of CAB-O-SPERSE SC-2 aqueous, dispersed, fumed silica was added, the jar was closed, the mixture was shaken for several minutes and allowed to stand for three days at room temperature without agitation. Next, 0.88 g of vinyltrimethoxysilane (VTM) was added to the emulsion with good stirring. The jar was

TABLE IV

| Silica Level pph | Silica Surface Area $m^2/g$ | percent Solids | Viscosity | pH cps | Tensile Strength MPa | Elongation percent |
| --- | --- | --- | --- | --- | --- | --- |
| 15 | 90 | 28 | 58 | 9.76 | 1.17 | 730 |
| 15 | 130 | 25 | — | 10.3 | 2.14 | 960 |
| 15 | 200 | 17 | 24 | 9.9 | 2.07 | 700 |
| 15 | 250 | 16 | 62 | 10.0 | 2.07 | 740 |
| 15 | 380 | 14 | <100 | 10.0 | 1.86 | 580 |
| 20 | 90 | 28 | 58 | 9.76 | 2.00 | 1200 |
| 20 | 130 | 25 | — | 10.3 | 2.20 | 1200 |
| 20 | 200 | 17 | 24 | 9.9 | 1.86 | 1200 |
| 20 | 250 | 16 | 62 | 10.0 | 1.79 | 1000 |
| 20 | 380 | 14 | <100 | 10.0 | 1.52 | 1040 |

EXAMPLE 4

A polydiorganosiloxane was prepared in the presence of filler by mixing 200 g of hydroxyl endblocked polydimethylsiloxane oligomer (molecular weight about 2600) with 100 g of CAB-O-SPERSE (R) B, a 15 percent solids dispersion of fumed silica having a surface area of about 200 m²/g and a pH of about 5.3, 130 g of deionized water, and 21 g of sodiumlaurylsulfate surfactant to give 5 parts of silica per 100 parts of polymer. This mixture was homogenized at 6000 psi in a laboratory homogenizer by giving three passes through the device to obtain a stable emulsion. The pH of the emulsion was lowered to 1.5 by admixing dodecylbenzenesulfonic acid. The mixture was allowed to polymerize for 5 days at room temperature, after which the emulsion was neutralized with diethylamine.

Then 26 g of the above emulsion was mixed with 7.94 g of a silica dispersion having 17 percent solids and recapped and the mixture was allowed to stand for two days at room temperature without agitation. Approximately 10 g of this mixture was placed in a vial, centrifuged lightly to exclude air bubbles, poured into a 100 mm diameter petri dish and allowed to dry at ambient conditions for one week. Mechanical properties of the resulting film were determined, the results are shown in Table II. Emulsion A contained 0.5 parts tin catalyst, 0.5 part VTM and 15 part SC-2 silica, all based on 100 parts of polymer.

An Emulsion B was prepared at the same time as Emulsion A and using the same procedure, except 52.5 g of Nalco 1050 colloidal silica was used in place of the SC-2 silica. Mechanical properties of the elastomeric film from Emulsion B were also determined at the same time as those of the film from emulsion A, as shown in Table II. Emulsion B contained 0.5 part tin catalyst, 0.5 part VTM, and 15 parts 1050 colloidal silica, all based on 100 parts of polymer.

TABLE II

| Elastomer | Type SiO2 (from) | Amount | Surface area m2/g | Tensile Strength (MPa) | Elongation (%) |
| --- | --- | --- | --- | --- | --- |
| emulsion A | SC-2 (Cabot) | 15 pph | 160 | 2.41 | 960 |
| emulsion B | 1050 (Nalco) | 15 pph | 150 | 0.69 | 680 |

A comparison of these results clearly shows the superiority of the use of the anionic, stable dispersion of fumed silica in water as the source of silica.

EXAMPLE 6

An emulsion 1 was prepared by placing into a one pint jar equipped with a mechanical stirrer 250 g of the anionically stabilized polydimethylsiloxane emulsion of Example 5. The stirrer was started and 0.88 g of vinyltrimethoxysilane was added dropwise to the emulsion, followed by 1.75 g of a 50 percent solids emulsion of dioctyltindilaurate. Next, the pH of the emulsion was raised to approximately 11 by addition (with stirring) of 3 g of 2-amino-2-methyl-1-propanol (AMP-95). Next, 146 g of CAB-O-SPERSE SC-2, aqueous, dispersed, fumed silica was poured into the emulsion with stirring. Stirring was continued for about 5 minutes, after which the jar was closed and the mixture was allowed to stand for three days at room temperature without agitation. This emulsion contained 0.5 pph vinyltrimethoxysilane, 0.5 pph tin catalyst, and 15 pph silica, all based on polymer by weight.

After three days, the jar was shaken to mix the ingredients and a 30 g aliquot was poured into a vial. The vial was lightly centrifuged to exclude air bubbles and approximately 8 g of this mixture was poured into a 100 mm diameter petri dish and allowed to dry under ambient conditions. After 5 days, mechanical properties of the resulting elastomeric film were determined; the results are shown in table III.

An Emulsion 2 was produced in the same manner as emulsion 1 except that fumed silica was substitued for the aqueous, dispersed, fumed silica. The same procedure for preparing emulsion 1 was used to prepare emulsion 2 up to the point of addition of silica. For emulsion 2, 120 g of deionized water was added to the emulsion with stirring followed by 26.3 g of Cabot (R) LM-7 fumed silica. Fumed silica was added to the emulsion in approximately 2-3 g increments spaced about 1-2 minutes apart so that the silica could become dispersed throughout the emulsion. When the last one quarter of silica was yet to be added, the mixture had a consistency of thick paste and mixing became difficult. An additional 5 g of deionized water had to be added to the mixture in order that the remainder of silica could be added and properly dispersed into the emulsion. After all of the silica was added, the mixture was stirred for an additional 15 minutes, the jar was capped and the mixture was allowed to stand for 3 days at room temperature without agitation.

Using the same procedures as those used for emulsion 1, a film was cast from emulsion 2 and its mechanical properties were determined; the results are given in table III.

Emulsion 2 contained 0.5 pph vinyltrimethoxysilane, 0.5 pph tin catalyst, and 15 pph Silica (by weight based on polymer); it was the same as emulsion 1 except that it contained LM-7 fumed silica in place of SC-2 aqueous, dispersed, fumed silica. Emulsion 2 also contained slightly more water than did emulsion 1. Since SC-2 aqueous, dispersed, fumed silica is LM-7 fumed silica dispersed in water, the only significant difference between emulsions 1 and 2 is the manner in which silica was incorporated into each mixture.

TABLE III

| Emulsion | Type Silica | Amount Silica | Tensile Strength | Elongation |
| --- | --- | --- | --- | --- |
| 1 | SC-2 | 15 pph | 2.51 MPa | 1300% |
| 2 | LM-7 | 15 pph | 1.10 MPa | 815% |

To 200 g of an anionically emulsified polydimethylsiloxane emulsion having a solids content of about 70 percent by weight and a pH of 10.5, the emulsion particles being less than 0.6 micrometers in average diameter and the polymer having a molecular weight average of greater than 240,000, in a 1 pint jar was added 0.7 g of stannous octoate. The emulsion was stirred for one minute to disperse the tin catalyst and stirring was continued while 1.4 g of 3,3,3-trifluoropropyl(methyl)-trimethoxysilane was added dropwise.

After all of the alkoxysilane crosslinker had been added, the emulsion was stirred for an additional two minutes. The jar was capped and the emulsion was allowed to remain undistrubed for one hour. Six 20 g aliquot of the crosslinked emulsion were weighed into vials. Next, sufficient aqueous, dispersed, fumed silica having a pH of 7.0, a solids content of 12 percent by weight and a surface area of 380 m2/g (CAB-O-SPERSE (R) F) was added to five of the vials such that the six samples now formed a series having the following levels of fumed silica: 0, 5.0, 7.5, 10.0, 12.0, and 15.0 parts fumed silica (solid) per 100 parts of silicone polymer (dry). Each vial was shaken to disperse the ingredients followed by a light centrifugation to exclude air bubbles.

Films were cast by pouring approximately 8 g of emulsion into a 100 mm diameter Petri dish and allowing the water to evaporate. Seven days after the films had been cast, mechanical properties were determined and they are given in Table IV.

TABLE IV

| SiO2 Level pph based on polymer | Tensile Strength MPa | Elongation % |
| --- | --- | --- |
| 0 | 0.21 | 450 |
| 5.0 | 0.76 | 1300 |
| 7.5 | 1.52 | 1440 |
| 10.0 | 2.55 | 1280 |
| 12.0 | 1.93 | 970 |
| 15.0 | 2.20 | 810 |

That which is claimed is:

1. An aqueous silicone emulsion which yields a reinforced elastomer upon removal of the water, said emulsion comprising an aqueous, anionic emulsion of crosslinked polydiorganosiloxane and a separately prepared anionic, stable dispersion of fumed silica in water.

2. An aqueous silicone emulsion which yields a reinforced elastomer upon removal of the water, said emulsion comprising an aqueous, anionic emulsion of crosslinked polydiorganosiloxane and fumed silica, the crosslinked polydiorganosiloxane being the product obtained by mixing a crosslinkable polydiorganosiloxane and a suitable crosslinking system, and the fumed silica being derived from a separately prepared anionic, stable dispersion of fumed silica in water.

3. The aqueous silicone emulsion of claim 2 in which the crosslinkable polydiorganosiloxane is hydroxy terminated and there is also present a multifunctional alkoxysilane and an organic tin compound in amounts sufficient to crosslink the polydiorganosiloxane.

4. The aqueous silicone emulsion of claim 3 in which the multifunctional alkoxysilane is an alkyltrialkoxysilane and the organic tin compound is an organic stannous compound.

5. The aqueous silicone emulsion of claim 4 in which the alkyltrialkoxysilane is vinyltrimethoxysilane and the organic stannous compound is stannous octoate.

* * * * *